(12) United States Patent
Trolese et al.

(10) Patent No.: US 8,237,064 B2
(45) Date of Patent: Aug. 7, 2012

(54) COVER PLATE AND KIT OF PARTS, INCLUDING SAID PLATE, FOR WALL MOUNTING OF AN ELECTRICAL APPARATUS

(75) Inventors: Lorenzo Trolese, Caronno Pertusella-Varese (IT); Mario Perrone, Casciago (IT)

(73) Assignee: BTICINO S.p.A., Milan (IT)

( * ) Notice: Subject to any disclaimer, the term of this patent is extended or adjusted under 35 U.S.C. 154(b) by 405 days.

(21) Appl. No.: 12/622,819

(22) Filed: Nov. 20, 2009

(65) Prior Publication Data
US 2010/0133000 A1 Jun. 3, 2010

(30) Foreign Application Priority Data
Nov. 28, 2008 (IT) .............................. RM2008A0635

(51) Int. Cl.
*H02B 1/40* (2006.01)
*H02G 3/08* (2006.01)
(52) U.S. Cl. ........... 174/503; 174/481; 174/67; 220/3.2; 220/241; 439/536
(58) Field of Classification Search .................... 174/66, 174/67, 480, 481, 50, 53, 57, 58, 61, 503; 220/3.2–3.9, 4.02, 241, 242; 439/535, 536
See application file for complete search history.

(56) References Cited

U.S. PATENT DOCUMENTS

| | | | | |
|---|---|---|---|---|
| 3,528,050 A | * | 9/1970 | Hindenburg | 439/535 |
| 3,680,031 A | * | 7/1972 | Schumacher | 174/51 |
| 3,728,468 A | * | 4/1973 | Grauer | 174/51 |
| 4,392,012 A | * | 7/1983 | Nattel | 174/51 |
| 4,745,523 A | * | 5/1988 | Moreau et al. | 174/51 |
| 6,087,588 A | * | 7/2000 | Soules | 174/66 |
| 7,284,996 B2 | * | 10/2007 | Kidman | 174/66 |
| 2006/0154503 A1 | | 7/2006 | Kidman | |

FOREIGN PATENT DOCUMENTS

| | | |
|---|---|---|
| WO | 2005/115111 | 12/2005 |
| WO | 2006/106555 | 10/2006 |

OTHER PUBLICATIONS

EP Search Report for RM2008A000635 filed on Nov. 28, 2008 in the name of Bticino S.P.A.
EP Written Opinion for RM2008A000635 filed on Nov. 28, 2008 in the name of Bticino S.P.A.

* cited by examiner

*Primary Examiner* — Angel R Estrada
(74) *Attorney, Agent, or Firm* — Steinfl & Bruno LLP

(57) ABSTRACT

A cover plate for wall-mounting at least one electrical apparatus is described. The cover plate comprises: a base to be fixed to a mounting bracket; at least one decorative portion coupled to the base and provided with a window; at least one portion of electrically conductive metal material and/or at least one surface coated with electrically conductive metal material; and at least one electrically conductive grounding element comprising at least one fixing portion adapted to be interposed and clamped between the base and the decorative portion for fixing the grounding element.

11 Claims, 9 Drawing Sheets

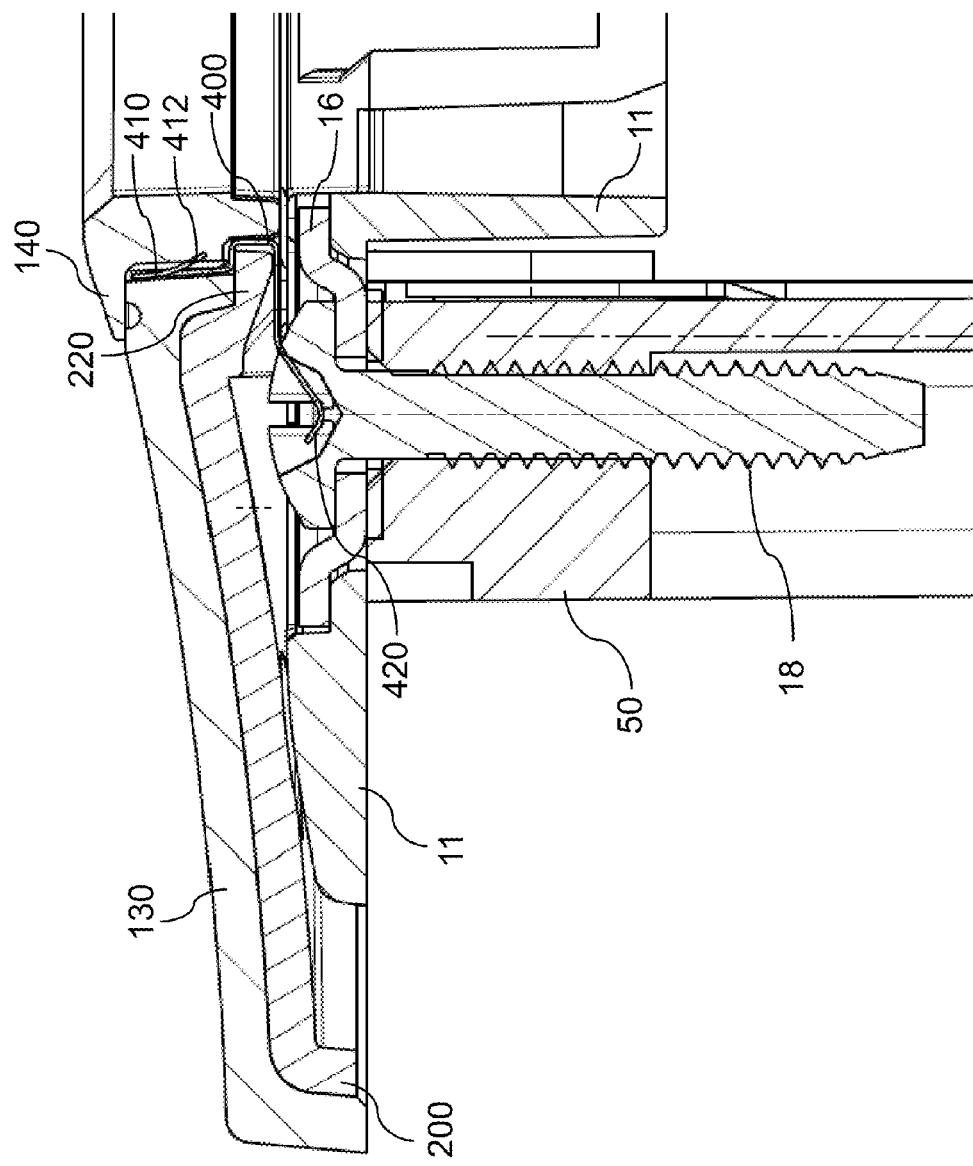

COVER PLATE AND KIT OF PARTS, INCLUDING SAID PLATE, FOR WALL MOUNTING OF AN ELECTRICAL APPARATUS

CROSS REFERENCE TO RELATED APPLICATIONS

The present application claims the priority of Italian patent application No. RM 2008A000635, filed on Nov. 28, 2008 and which is herein incorporated by reference.

FIELD

The present disclosure refers to the technical field of devices for wall-mounting electrical apparatuses, and more in particular, it refers to a cover plate and a kit of parts, including said plate, for wall mounting an electrical apparatus.

BACKGROUND

It is known that many of such electrical apparatuses are usually wall mounted by means of composite mounting structures, or kits of parts, generally including:

a box intended to be flush-mounted into the wall;

an apparatus mounting bracket to be fixed to said box, directly or by means of adapters called "mudrings"; and a cover plate to be fixed to the mounting bracket and provided with openings for allowing a user to access, visually or manually, the electrical apparatus to be mounted on the apparatus mounting bracket.

In said above mentioned mounting structures, the cover plate should ensure a minimal protection of the electrical apparatus, for example from dust, and avoid hazardous access (for example by pointed objects) to electrical conductive parts of the electrical apparatus. A further function of cover plates is also to act like a screen inhibiting electrical arcs, flames, incandescent wires to reach outside, in order to protect against fires.

Another task of cover plates is also to mask unpleasant views due, for instance, to cavities in the wall, and due to the box and mounting bracket, which are more functional than pleasing to the eye, therefore contrasting with aesthetic requirements.

Some cover plates often have at least one portion, which, in normal usage, is to be exposed and which is made of metallic material and/or has a surface covered by a layer of metal coating. In other words, these cover plates have an exposed portion, i.e. a touchable portion, which is electrically conductive.

For example, in the international patent application WO 2006/106555 a composite cover plate is described, which comprises a base portion, and a decorative portion, comprising a mask and an internal frame (which, in the example shown, is a fixing element as well as a decorative element). The mask and the internal frame represent the decorative portion of the cover plate. The mask and/or the internal frame may be made of, or may at least be partially coated with, an electrically conductive metal, so that the problem arises regarding the grounding of such exposed electrically conductive portions of the cover plate.

One solution known in the art for grounding the cover plate is the use of a pair of screws passing through the cover plate in order to fix the cover plate to an apparatus mounting bracket and also allow the electrical connection of the cover plate to the mounting bracket and to a flush box. The screws passing through the cover plate, however, entail a problem regarding the visual appearance, in that the screw heads are visible and interrupt the visual continuity of the decorative portion of cover plate.

SUMMARY

According to some of its embodiments, the present disclosure is aimed at providing a solution for grounding the electrically conductive exposed portions of a cover plate, thus allowing to overcome the above mentioned drawback with reference to the grounding solution provided by the above mentioned known art.

According to a first aspect, a cover plate for wall mounting at least one electrical apparatus is provided, comprising: a base adapted to be fixed to a mounting bracket and provided with a through opening for receiving a front portion of the at least one electrical apparatus; at least one decorative portion coupled to the base and provided with a window, which cooperates with the through opening and which is adapted to receive the front portion of the at least one electrical apparatus; at least one metal portion of electrically conductive metal material and/or at least one coated surface coated with electrically conductive metal material; and at least one electrically conductive grounding element, provided for grounding the metal portion and/or the coated surface, comprising at least one fixing portion adapted to be interposed and clamped between the base and the at least one decorative portion for fixing the at least one electrically conductive grounding element.

According to a second aspect, a kit of parts for wall mounting at least one electrical apparatus is provided, comprising: a mounting bracket adapted be fixed to a wall; and the cover plate according to the above paragraph, wherein the mounting bracket is made of electrically insulating material and comprises an electrically conductive metal insert, which is intended to be electrically connected to the grounding element.

Further aspects are shown in the specification, drawings and claims of the present application.

BRIEF DESCRIPTION OF THE DRAWINGS

The present disclosure will be more readily understood from the following detailed description of some embodiments thereof, which are intended to be illustrative and therefore non limiting, with reference to appended drawings, wherein:

FIG. 10 shows a partial sectional and lateral view of a kit of parts comprising the cover plate of FIG. 7, wherein the parts shown are assembled.

In the figures, same or like elements are provided with the same numeral references.

DESCRIPTION OF EXAMPLE EMBODIMENTS

Figure 1:
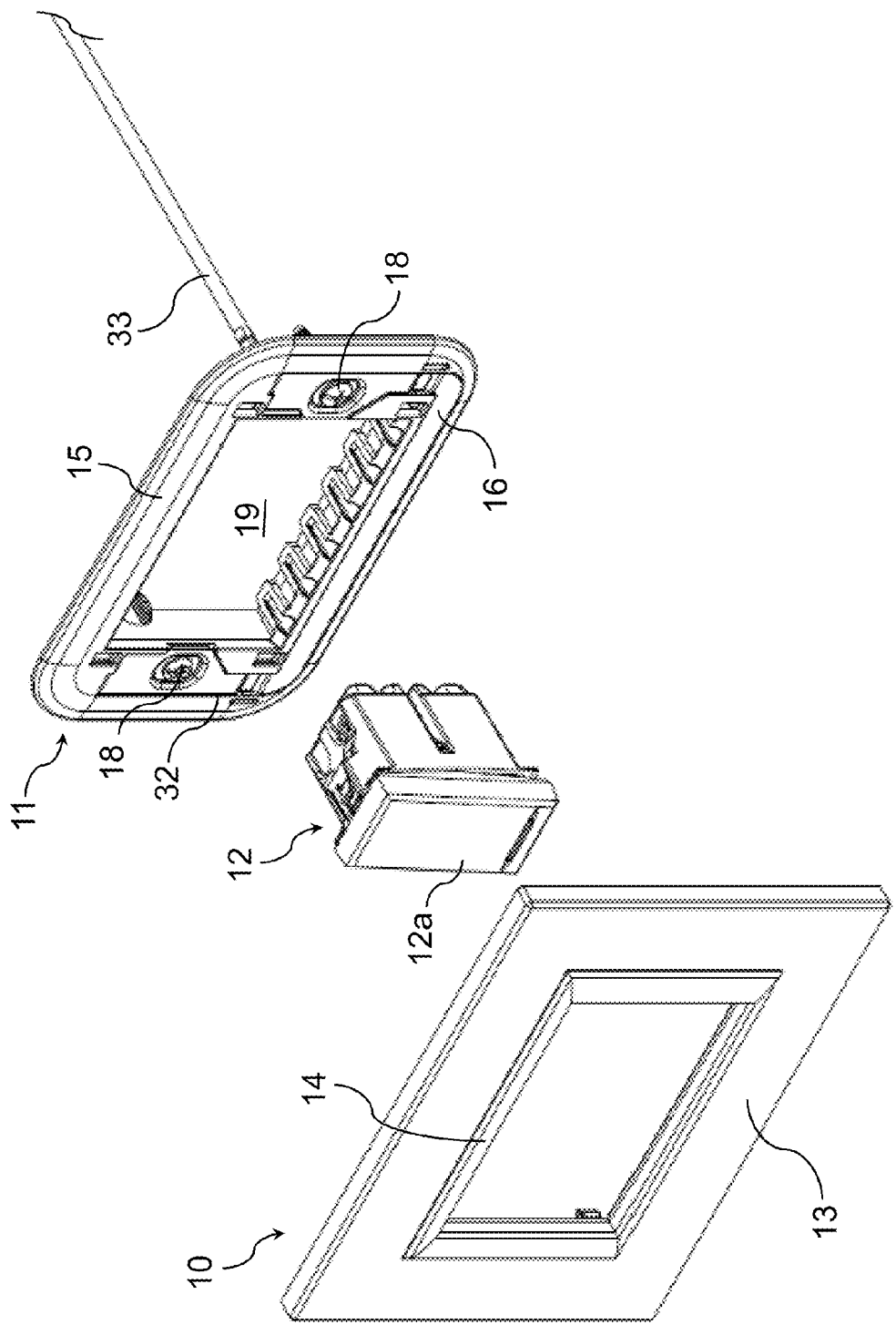
FIG. 1 shows a perspective view of a kit of parts, with detached parts, comprising a cover plate and a mounting bracket, for wall-mounting an electrical apparatus.

In the present description, an electrical apparatus is defined as an electrical device or element which can be part of electrical systems in residential buildings and similar, and which is usually intended to be surface mounted, for example on walls of such buildings.

The above definition includes, in a non limiting way, switches, electrical sockets, sockets for data networks, TV sockets, phone sockets, buttons, selectors, switchpoints, electrical control devices in general, connectors, thermostats, timers, fuse holders, alarms/buzzers, emergency lamps such as removable emergency lamps, signaling lights such as floor lights, displays such as LCDs, and similar.

With reference to the appended figures, reference numbers 10, 11 refer to a kit of parts for wall mounting an electrical apparatus 12, such as a switch 12 of an electrical residential installation.

The kit of parts 10, 11 comprises a mounting bracket 11 to be fixed, for example by means of a pair of screws 18, to a mounting wall or an electrical box which may be flush mounted to a wall, which is not shown in the figures. In the described example, the screws 18 are entirely made of an electrical conductive metal material.

The mounting bracket 11 comprises a mounting window 19, in which one or more electrical apparatuses 12 may be fixed, which may be electrical modular apparatuses. The electrical apparatuses 12 can be fixed to the mounting bracket 11 by way of a snug and snap fit fixing system.

According to some embodiments, the mounting bracket 11 has a frame-like main body 34, comprising four frame sides, which are parallel and opposed in pairs, made of electrically insulating material, for example a hard plastic. In this embodiment, the mounting bracket 11 also comprises a metal grounding insert 16 which is housed in a corresponding recess 32 defined in the thickness of the primary body of bracket 11, and which is open on the face of mounting bracket 11 to face the cover plate 10. In an embodiment, the metal grounding insert 16 is U-shaped, and comprises a central segment extending along a side of mounting window 19 and two lateral segments extending at least partially along a respective further side of said window 19. The metal grounding insert 16 is electrically connectable/connected to an electrical grounding cable 33 which is to be electrically connected to a grounding line of the electrical residential power grid. The metal grounding insert 16 can be a metal bar.

In an embodiment, the metal grounding insert 16 has a tab (not shown in the figures) which completely passes through the body of the mounting bracket 11 and protrudes from the face of the mounting bracket to be facing the mounting wall. The tab has a hole for connecting the grounding cable 33, e.g. by way of a terminal to be riveted on said hole.

The kit of parts 10, 11 also comprises a cover plate 10 to be fixed to the mounting bracket 11. The cover plate 10 comprises an essentially plate-like main body and, in the example shown, it comprises a decorative portion 13, 14 comprising a mask 13 and internal frame 14.

The cover plate 10 has at least one exposed surface or an exposed electrical conductive portion, accessible through hand touching when the cover plate 10 is fixed to the supporting wall by way of the mounting bracket 11. For example, the mask 13 is made of electrically conductive metal material and/or its surface is coated with a layer of electrically conductive metal material. In another example, the internal frame 14 is made of electrically conductive metal material and/or its surface is coated with a layer of electrically conductive metal material.

In what follows, reference will be made to an exemplary and non-limitative embodiment where both the mask 13 and the internal frame 14 have an exposed electrically conductive surface, for example being both coated with a layer of electrically conductive metal material.

Figure 2:
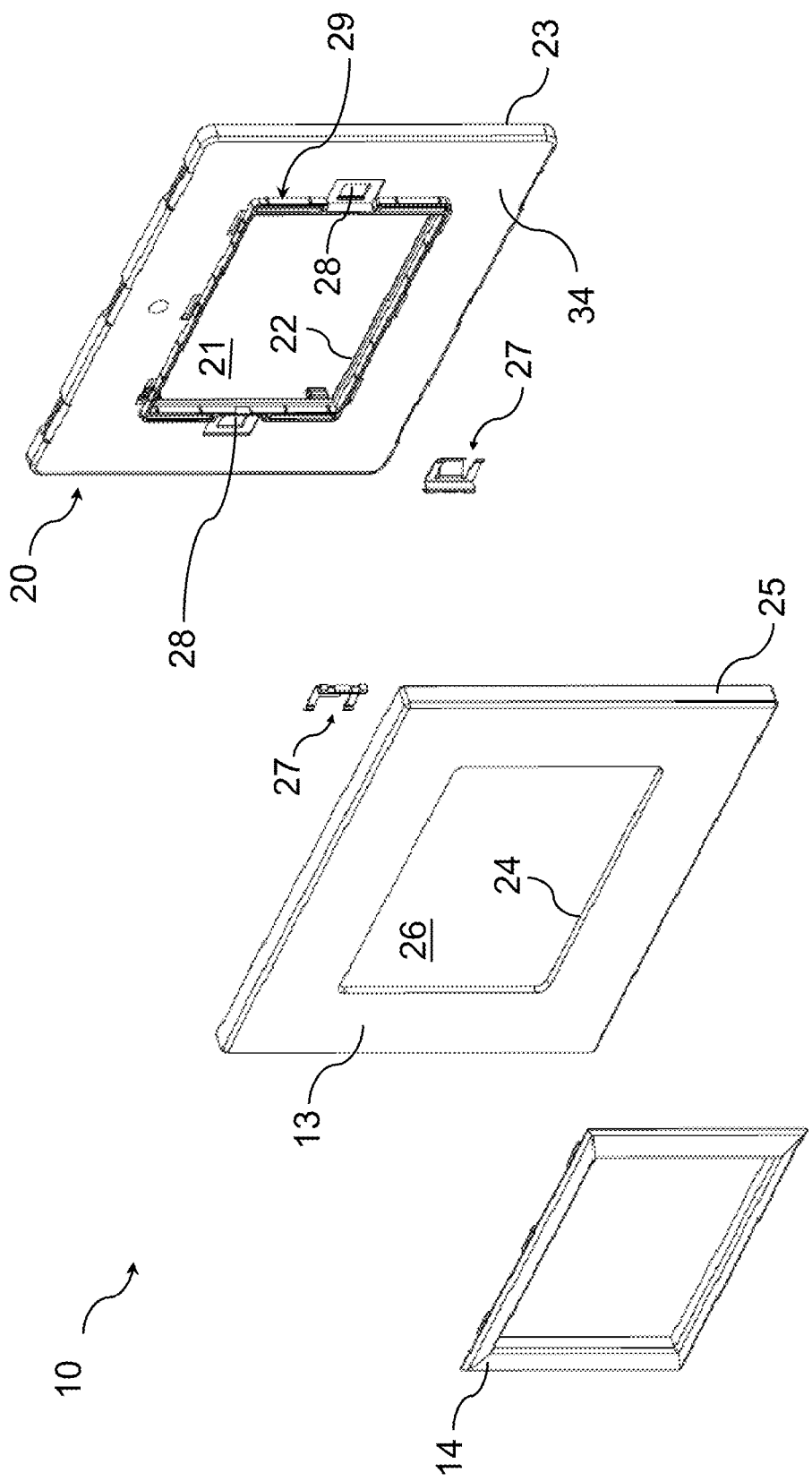
FIG. 2 shows a perspective view and an exploded view of the cover plate of FIG. 1.

With reference to FIG. 2, the cover plate 10, which in the figure is shown with detached parts, comprises, beside the mask 13 and internal frame 14, a base 20, or sub-plate 20, in which a through opening 21 is defined, to receive the front portion 12a of the at least one electrical apparatus 12. In the particular example shown, the through opening 21 is a single opening defined by an internal edge 22 of main body of base 20. In fact, the through opening 21 is defined within the thickness of base 20 and is such as to allow a user to establish an interaction, whether by touching or viewing, with the electrical apparatus 12 to be wall mounted. The internal edge 22 surrounding the opening 21 can have at least one protruding portion 29, which, in the example shown, is composed of a protruding collar 29 completely surrounding the through opening 21.

According to an embodiment of the disclosure, the mask 13 is shaped in a way to form a shell-like envelope for base 20, and is defined between an external peripheral edge 25 and an internal peripheral edge 24, which, in the example of FIG. 2, have a substantially square-like shape.

According to a first embodiment, the mask 13 may be snug and snap fixed to base 20 and the internal frame 14 may be snug and snap fixed to base 20, for example to the protruding collar 29. According to an alternative embodiment, the internal frame 14 may be snug and snap fitted to base 20 and provides a fixing element for mask 13 and base 20, since it is clamped between the internal frame 14 and base 20, when the latter are fitted together.

In the example shown, the base 20 has a frame-like squared shape and is defined between the internal peripheral edge 22 and an external peripheral edge 23.

The base 20 can be made of electrically insulating material, for example a relatively stiff plastic material.

Figure 3:
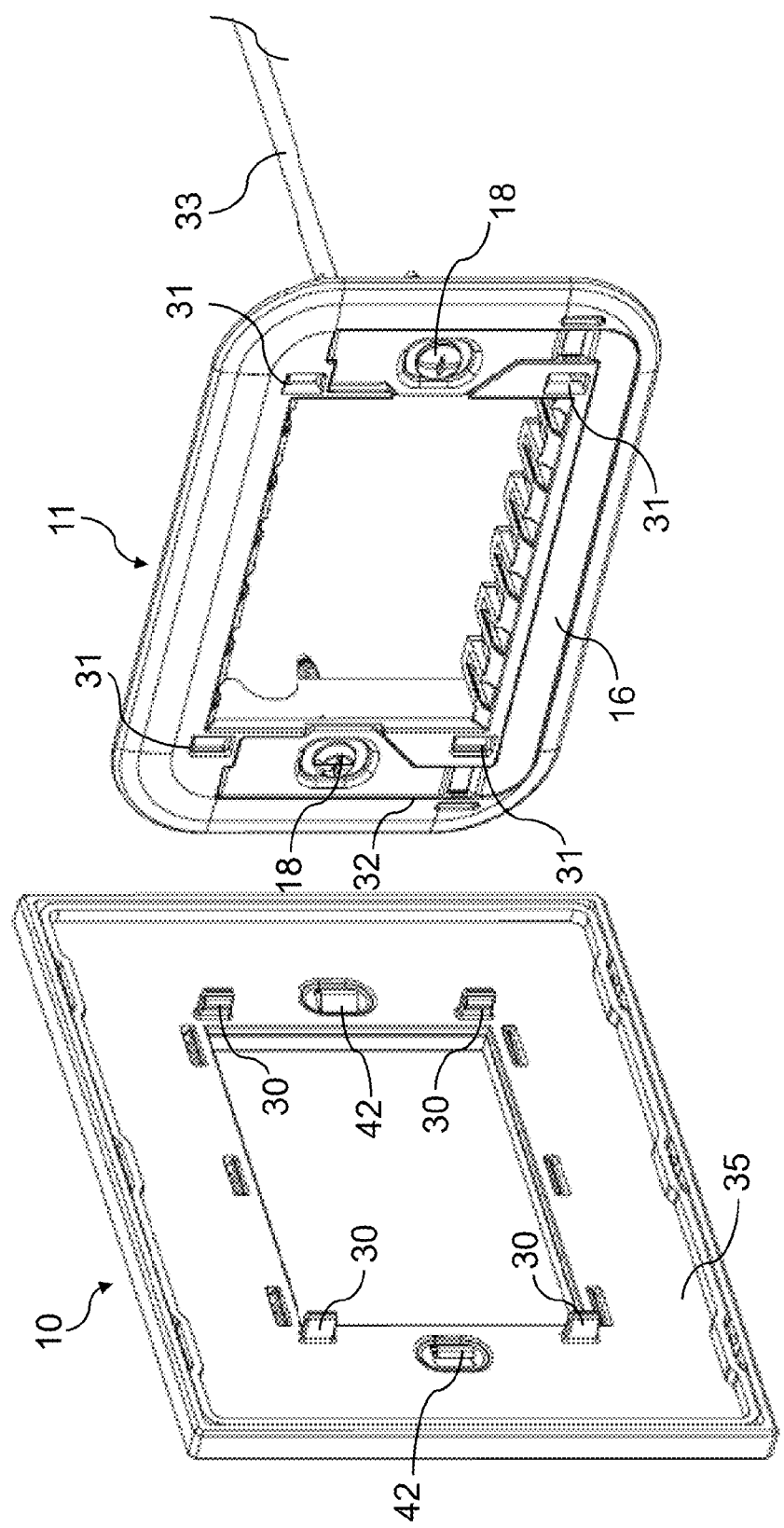
FIG. 3 shows another perspective view of the kit of parts of FIG. 1.

Base 20 comprises fixing elements 30, shown in FIG. 3, for fixing base 20 to mounting bracket 11, by cooperating with conjoined fixing elements 31 provided on the mounting bracket 11. The fixing elements 30, 31 can be snap fit fixing elements, with a plurality of progressive snap-ins. The base 20 can comprise fixing elements comprised of latching teeth 30, for example four latching teeth 30, and the mounting bracket 11 comprises holes 31, each adapted to receive a respective latching tooth 30.

With reference to FIG. 2, the cover plate 10 further comprises at least one electrically conductive grounding element 27, which is provided for grounding the exposed electrically conductive portions of cover plate 10. In the particular example shown, the cover plate 10 comprises two grounding elements 27.

As already mentioned, in the particular embodiment shown, both the mask 13 and the internal frame 14, which represent the decorative portion of cover plate 10, have exposed electrically conductive surfaces. Therefore, in the particular embodiment of the description, the grounding elements 27 are provided for grounding both the mask 13 and the internal frame 14.

Figure 5:
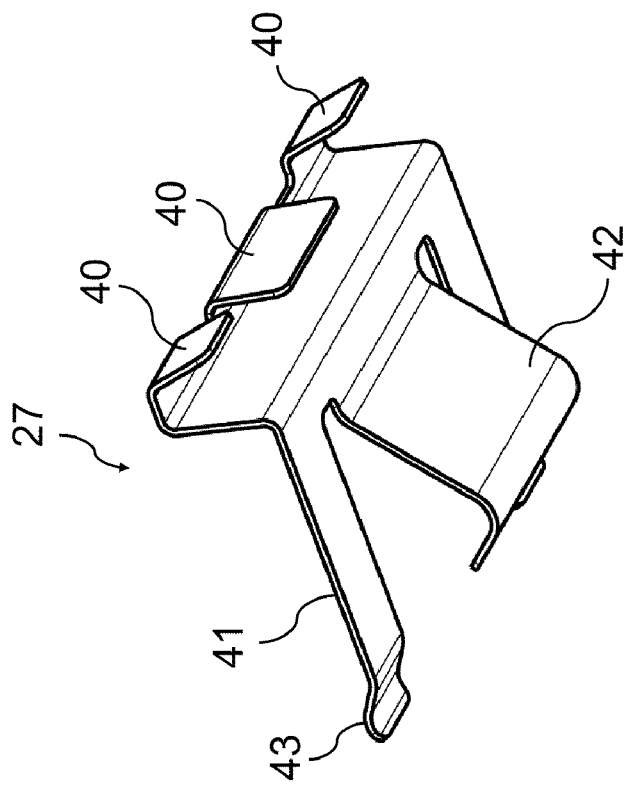
FIG. 5 shows a perspective view from below of a grounding element included in the cover plate of FIG. 1.
Figure 4:
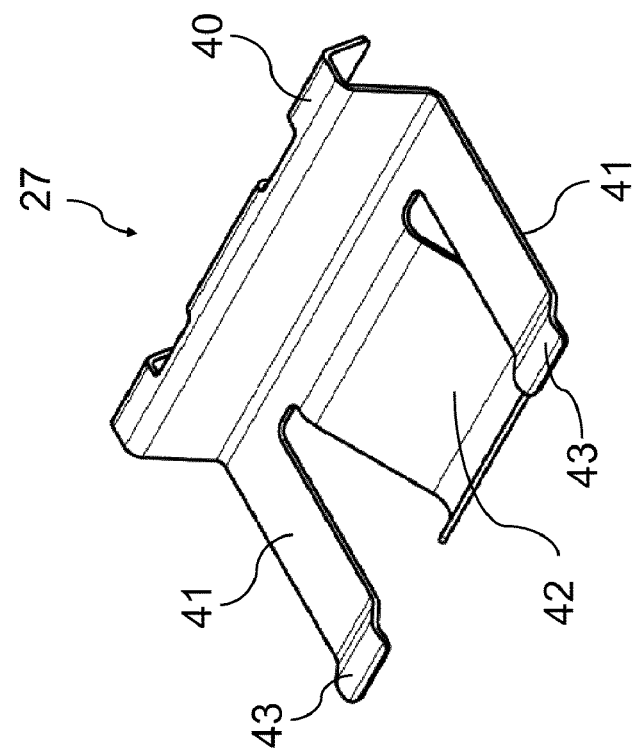
FIG. 4 shows a perspective view from above of a grounding element included in the cover plate of FIG. 1.

In FIGS. 4 and 5, a particular example of grounding element 27 is shown in greater detail. The grounding element 27 can comprise a punched and bent metal plate, for example of stainless steel.

The grounding element 27 comprises a fixing portion 40, 41 to be interposed and clamped between the base 20 and decorative portion 13, 14 of cover plate 10, in order to fix the grounding element to the cover plate.

In general, the fixing portion 40, 41 may be interposed and clamped:

between the mask 13 and base 20; or
between the frame 14 and base 20; or
between the mask 13 and the base 20 and between the frame 14 and base 20.

In the embodiment shown in FIGS. 4 and 5, the fixing portion 40, 41 comprises two arms 41 to be interposed and clamped between the mask 13 and base 20, said arms 41 possibly comprising a curved free end portion 43. As an alternative, or in addition to the above mentioned arms 31, it is possible to provide the fixing portion 40, 41 with a U-shaped profile portion 40, straddling the raised edge 29 of base 20 adjacent the through opening 21, in order to be interposed and clamped between the internal frame 14 and base 20.

The grounding element 27 also comprises a flexible contact tab, which, in the example, is interposed between the arms 41, and is provided for electrical connection to an electrically conductive surface of mounting bracket 11. According to an embodiment of the disclosure, the flexible contact tab is, or is comprised of, a flexible tooth 42 which has to protrude from base 20 on the side facing the mounting bracket 11. The flexible tooth 42 can comprise a curved free end portion.

In an embodiment, in order to allow the flexible tooth 42 to pass through the base 20 and protrude towards the mounting bracket 11, at least one through opening 28 (shown in FIG. 2) is defined in base 20, which is not communicating with the through opening 21, or is formed by a recess or notch connected with through opening 21. In this way, as shown in FIG. 3, the flexible tooth 42 may pass through the base 20 in order to be electrically connected to the grounding insert 16 of mounting bracket 11, or directly, as shown in FIG. 3, by means of a screw 18, associated with the mounting bracket 11. In fact, when the cover plate 10 is snap fixed to the mounting bracket 11, the flexible tooth 42 abuts against the head of a screw 18.

Figure 6:
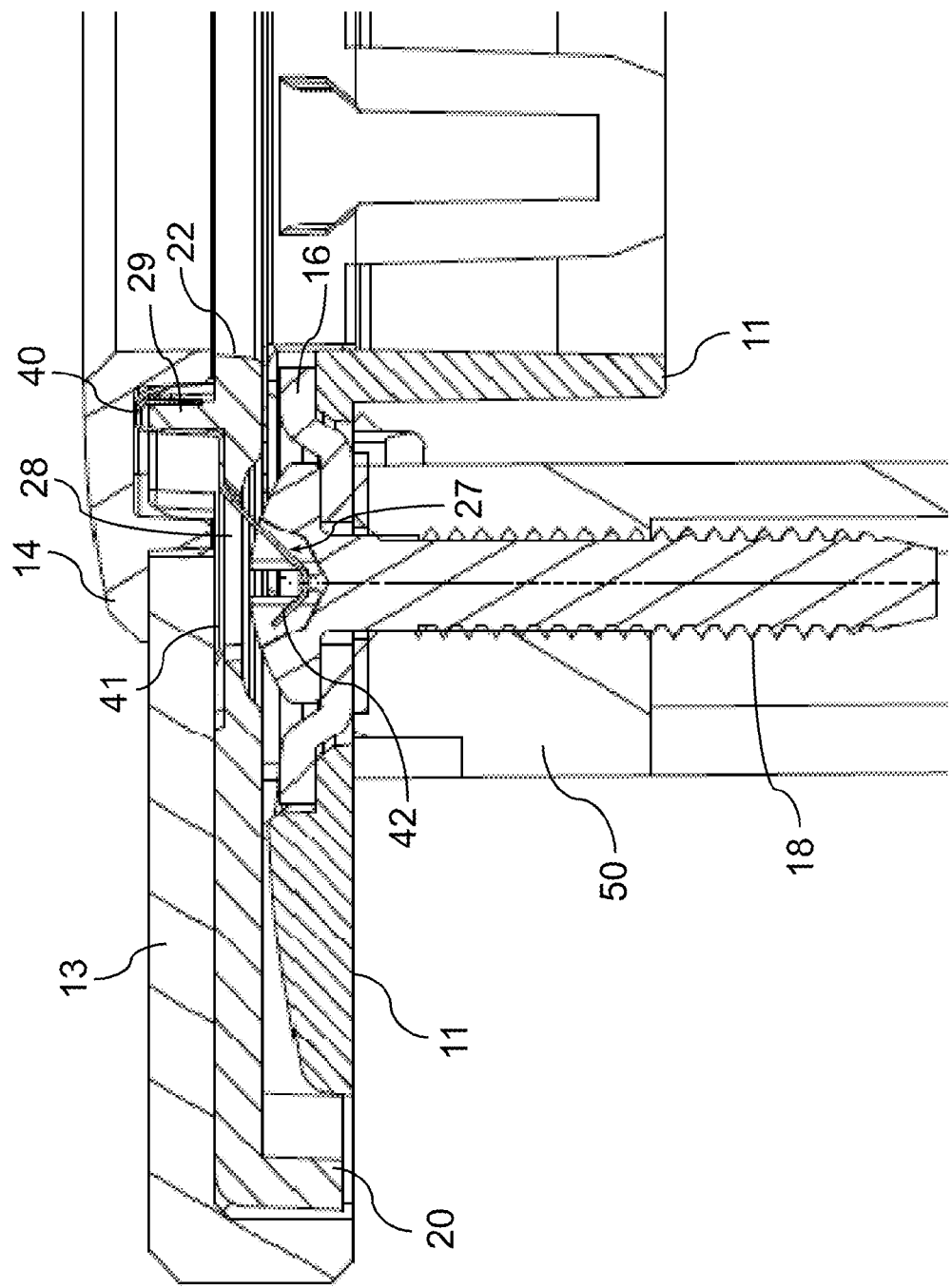
FIG. 6 shows a partial sectional and lateral view of kit of parts of FIG. 1, wherein the parts are assembled.

FIG. 6 shows a partial sectional and lateral view of the kit of parts of FIG. 1, in which a wall mounting box is also partially shown, which is for example made of plastic or similar. As shown in the figure, the flexible tooth 42 passes through opening 28 and abuts against the fixing screw 18, therefore allowing the electrical connection of grounding element 27 to screw 18. For the sake of clarity, in FIG. 6 the head of screw 18 is shown as hollow, so that the flexible tooth 42 is not bent or is only slightly inflected. The person skilled in the art will understand that in a real situation, the flexible tooth 42 is bent against the head of screw 18 in order to ensure a stable electrical contact between the tooth 42 and screw 18.

The screw 18 passes through metal insert 16, and its head abuts against said metal insert 16. The metal insert 16 is in turn electrically connected to a grounding line by means of cable 33 (shown in FIG. 1). Arms 41 of grounding element 27 are interposed and clamped between the base 20 and mask 13. The latter is coated with a layer of electrically conductive metal material and is therefore electrically connected, through arms 31, to grounding element 27. Moreover, the U-shaped portion 40 of grounding element 27 has a portion interposed and clamped between base 22 and internal frame 14. The latter is coated with a layer of electrically conductive metal material and therefore, through the U-shaped portion 40 of grounding element 27, it is electrically connected to grounding element 27. In this way it is possible to connect to the grounding line of electrical power grid the exposed electrically conductive portions of cover plate 20. In an embodiment, the progressive latching system of base 20 to bracket 11 is sized in a way that the first snapping-in already allows the flexible tooth 42 of grounding element 27 to contact the head of screw 18, in order to ground the cover plate 10. In this way it is possible to compensate imperfections or additional thicknesses (for example due to wallpaper) of wall.

Figure 7:
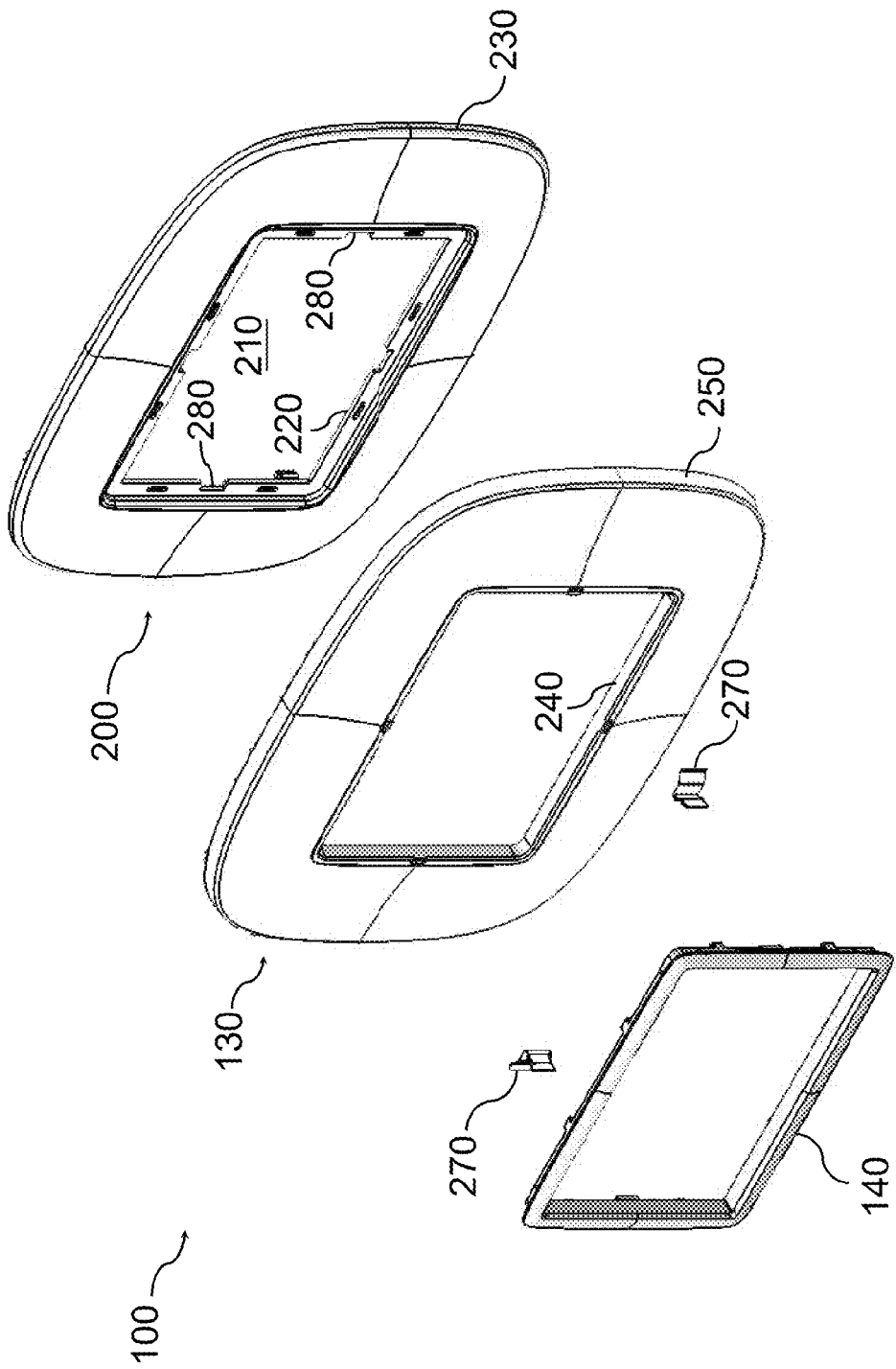
FIG. 7 shows a further embodiment of the cover plate.

FIG. 7 shows a further embodiment of cover plate 100. The cover plate 100 comprises a base 200 and a decorative portion 130, 140. The decorative portion 130, 140 comprises an internal frame 140 and a mask 130. The mask 130 forms a shell-like envelope for base 20 and is defined between an internal peripheral edge 240, of substantially squared shape, and an external peripheral edge 250, of substantially squared shape, but having cambered sides and rounded corners.

The base 200 has a substantially plate-shaped main body defined between an internal peripheral edge 220, of substantially squared shape, and an external peripheral edge 230 of substantially squared shape, but having cambered sides and rounded corners. In the main body of base 200 a through opening 210 is defined, which is framed by the internal peripheral edge 220. The internal peripheral edge 220 has at least one recess 280 (two in the example shown), through which a respective grounding element 270 may pass.

Figure 9:
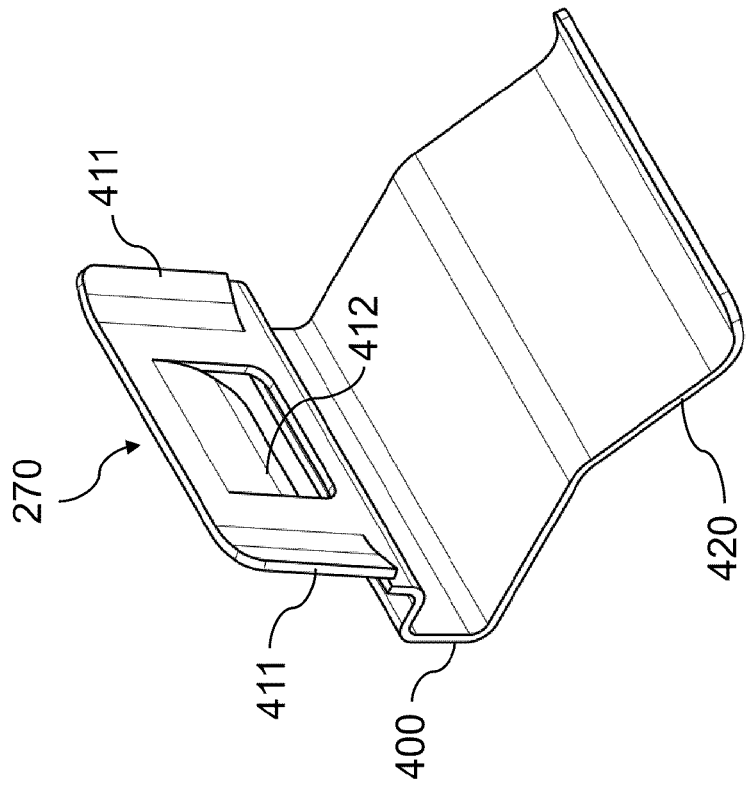
FIG. 9 shows another perspective view of the grounding element of FIG. 8.
Figure 8:
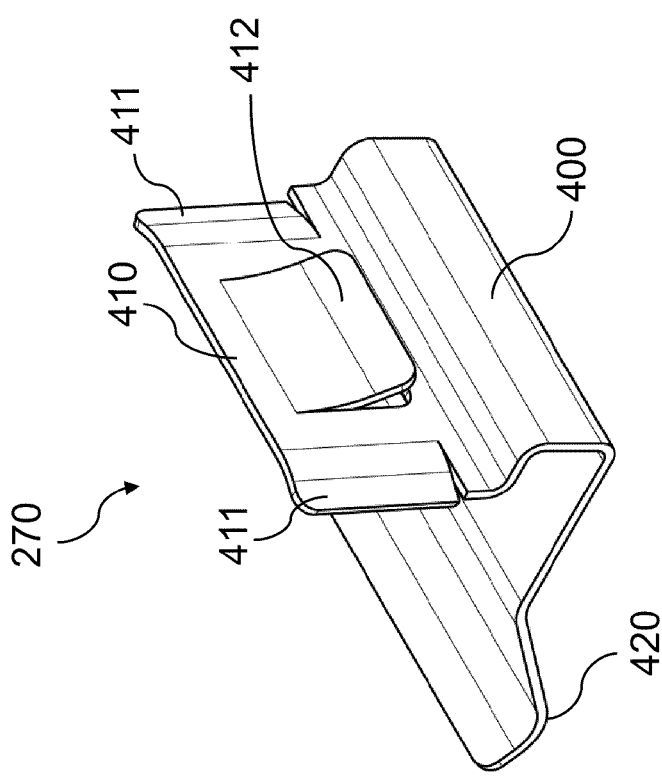
FIG. 8 shows a perspective view of a grounding element included in the cover plate of FIG. 7.

The grounding element 270 can be better seen in FIGS. 8 and 9 and comprises a fixing portion 400 to be interposed and clamped between the base 200 and internal frame 140 and also comprising a flexible contact tab 420. The latter is formed by a flexible tooth 420 provided with a curved free end portion.

The fixing portion 400 comprises an U-shaped portion which may straddle a base portion 200, which is reciprocally shaped with respect to said U-shaped portion, in this example, straddling the internal peripheral edge 220 of base 200.

The grounding element 270 comprises a further contact portion 410, comprising a tab 410 provided with an elastic tooth 412 protruding from a face of tab 410 and at least one curved pin (in the example shown, 2 curved lateral pins 411), which is bent towards the other face of tab 410.

FIG. 10 shows a partial sectional and lateral view of a kit of parts similar to FIG. 6, wherein the kit comprises a cover plate 200 of the type shown in FIG. 7.

The flexible tooth 420 passes through recess 280 (FIG. 7) and abuts against the fixing screw 18, therefore allowing the electrical connection of grounding element 270 to screw 18.

For the sake of clarity, in FIG. 6 the head of screw 18 is shown as hollow, so that the flexible tooth 42 is not bent or is only slightly inflected. The person skilled in the art will understand that in a real situation, the flexible tooth 42 is bent against the head of screw 18 in order to ensure a stable electrical contact between the tooth 42 and screw 18.

The screw 18 passes through metal insert 16, and its head abuts against said metal insert 16. The metal insert 16 is in turn electrically connected to a grounding line by means of cable 33 (shown in FIG. 1). The U-shaped portion 400 of grounding element 270 has a portion interposed and clamped between base 200 and internal frame 140. The latter is coated with a layer of electrically conductive metal material and therefore, it is electrically connected to grounding element 270. Moreover, the contact tab 410 is interposed between the internal frame 140 and mask 130, the tooth 412 abutting against frame 140 and the dowel pins 411 abutting, being pushed by tooth 412, against mask 130. This mask is coated with a layer of electrically conductive metal material and is therefore electrically connected, through contact portion 410, to grounding element 270. In this way it is possible to connect the exposed electrically conductive portions of cover plate 270 to the grounding line of electrical network.

Figure 11:
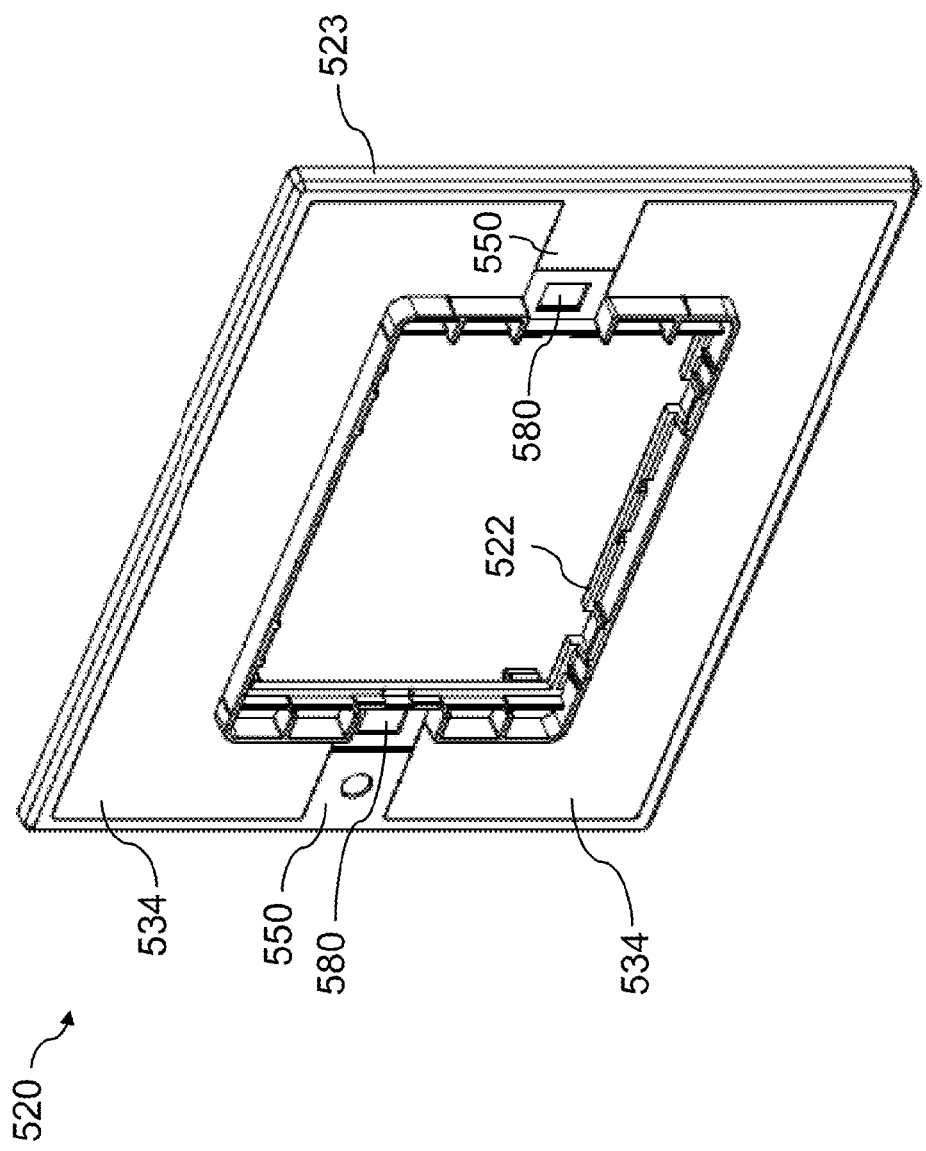
FIG. 11 shows a modification of a base to be used with the cover plate of FIG. 2.

FIG. 11 shows an alternative embodiment of a base 520 which may be used in the cover plate 10 of FIG. 2. Such a base 520 has an external decorative frame 523 which is formed or at least partially coated by electrically conductive metal material. For example, such an external frame 523 is made of ABS and is then subject to a selective chroming step. The base 520 comprises at least an electrical connection portion 550 to be electrically connected to grounding element 27 (FIG. 4), for example by means of contact with arms 41, in order to also ensure grounding of external frame. For example, base 520 comprises an internal portion 534 made of polycarbonate and an external frame 523, the internal portion 534 and external frame 523 being directly assembled and fabricated by co-molding, wherein the external frame 523 successively undergoes a selective chroming treatment. The external frame 523 comprises two electrical connection protrusions 550 protruding inwardly of the external frame 523 and which will also be chromed.

From the above description it is possible to understand how a cover plate of the above mentioned type allows the grounding of exposed electrically conductive portions of the plate, without using screws passing through the body of the plate that remain visible during the normal use of plate.

In the above described kit of parts, the grounding of the plate takes place by directly connecting the plate to the mounting bracket, without passing through the electrical apparatus 12, which therefore may be an apparatus without grounding wires or terminals.

It is to be understood that the person skilled in the art, in order to comply with specific and contingent needs, may introduce various modifications and variants to the above described cover plate and kit of parts, which are all contained within the scope of protection of the disclosure, as defined in the following claims.

The invention claimed is:

1. Cover plate for wall mounting at least one electrical apparatus, comprising:
a base adapted to be fixed to a mounting bracket and provided with a through opening for receiving a front portion of the at least one electrical apparatus;
at least one decorative portion coupled to the base and provided with a window, which cooperates with the through opening and which is adapted to receive the front portion of the at least one electrical apparatus;
at least one metal portion of electrically conductive metal material and/or at least one coated surface coated with electrically conductive metal material; and
at least one electrically conductive grounding element, provided for grounding the metal portion and/or the coated surface, comprising at least one fixing portion adapted to be interposed and clamped between the base and the at least one decorative portion for fixing the at least one electrically conductive grounding element,
wherein the grounding element further comprises a flexible contact tab adapted to be electrically connected to an electrically conductive surface of the mounting bracket.

2. The cover plate according to claim 1, wherein the contact tab is a flexible tooth protruding from a face of the base, which face is to be opposed to the mounting bracket.

3. The cover plate according to claim 1, wherein the fixing portion comprises two arms, and wherein the contact tab is interposed between the two arms.

4. The cover plate according to claim 3, wherein the arms comprise a free curved end portion.

5. The cover plate according to claim 1, wherein the fixing portion comprises an U-shaped portion, straddling a portion of the base or of the decorative portion, which is complementarily shaped with respect to the U-shaped portion.

6. The cover plate according to claim 1, wherein the decorative portion comprises a mask for shell-like enveloping the base portion, the mask comprising the at least one metal portion and/or the at least one coated surface.

7. The cover plate according to claim 5, wherein the decorative portion comprises an inner frame comprising the at least one metal portion and/or the at least one coated surface.

8. The cover plate according to claim 1, wherein said base comprises:
an external decorative frame, which is formed or at least partially coated by electrically conductive metal material, and
at least one electrical connection portion adapted to be electrically connected to the grounding element, in order to ensure grounding of the external decorative frame.

9. A kit of parts for wall mounting at least one electrical apparatus, comprising:
a mounting bracket adapted to be fixed to a wall; and
a cover plate for wall mounting at least one electrical apparatus, comprising:
a base adapted to be fixed to a mounting bracket and provided with a through opening for receiving a front portion of the at least one electrical apparatus;
at least one decorative portion coupled to the base and provided with a window, which cooperates with the through opening and which is adapted to receive the front portion of the at least one electrical apparatus;
at least one metal portion of electrically conductive metal material and/or at least one coated surface coated with electrically conductive metal material; and
at least one electrically conductive grounding element, provided for grounding the metal portion and/or the coated surface, comprising at least one fixing portion adapted to be interposed and clamped between the base and the at least one decorative portion for fixing the at least one electrically conductive grounding element,
wherein the mounting bracket is made of electrically insulating material and comprises an electrically conductive metal insert, which is intended to be electrically connected to the grounding element.

10. The kit of parts according to claim 9, wherein the mounting bracket comprises a frame-like main body and a recess, the recess being provided into the thickness of the frame-like main body and adapted to receive the electrically conductive metal insert.

11. The kit of parts according to claim 9, wherein the insert is a substantially U-shaped plate-like bar.

* * * * *